United States Patent
Aslan et al.

(10) Patent No.: US 7,828,479 B1
(45) Date of Patent: Nov. 9, 2010

(54) THREE-TERMINAL DUAL-DIODE SYSTEM FOR FULLY DIFFERENTIAL REMOTE TEMPERATURE SENSORS

(75) Inventors: Mehmet Aslan, Sunnyvale, CA (US); Richard Henderson, Sunnyvale, CA (US); Chung Wai Benedict Ng, Mountain View, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/820,535

(22) Filed: Apr. 8, 2004

Related U.S. Application Data

(60) Provisional application No. 60/461,538, filed on Apr. 8, 2003.

(51) Int. Cl.
*G01K 7/01* (2006.01)

(52) U.S. Cl. .............. 374/178; 374/170; 374/163; 702/130; 327/512

(58) Field of Classification Search .............. 374/178, 374/163; 327/512; 257/470; 365/210.1, 365/211, 212, 207, 208
See application file for complete search history.

(56) References Cited

U.S. PATENT DOCUMENTS

| | | | | |
|---|---|---|---|---|
| 3,181,364 A * | 5/1965 | Barton | ............. | 374/109 |
| 3,809,929 A * | 5/1974 | Vittoz | ............. | 327/512 |
| 3,812,717 A * | 5/1974 | Miller et al. | ............. | 374/178 |
| 4,017,748 A * | 4/1977 | Davis | ............. | 327/540 |
| 4,165,642 A * | 8/1979 | Lipp | ............. | 374/170 |
| 4,791,380 A * | 12/1988 | Chiappetta | ............. | 327/513 |
| 5,094,546 A * | 3/1992 | Tsuji | ............. | 374/178 |
| 5,195,827 A * | 3/1993 | Audy et al. | ............. | 374/172 |
| 5,461,584 A * | 10/1995 | Ikuta et al. | ............. | 327/516 |
| 5,546,041 A * | 8/1996 | Szajda | ............. | 327/512 |
| 5,639,163 A * | 6/1997 | Davidson et al. | ............. | 374/178 |
| 5,660,474 A * | 8/1997 | Kurihara | ............. | 374/178 |
| 5,982,221 A * | 11/1999 | Tuthill | ............. | 327/512 |
| 5,993,060 A * | 11/1999 | Sakurai | ............. | 374/178 |
| 6,008,685 A * | 12/1999 | Kunst | ............. | 327/512 |
| 6,019,508 A * | 2/2000 | Lien | ............. | 374/178 |
| 6,046,492 A * | 4/2000 | Machida et al. | ............. | 257/567 |
| 6,097,239 A * | 8/2000 | Miranda et al. | ............. | 327/512 |
| 6,140,860 A * | 10/2000 | Sandhu et al. | ............. | 327/513 |
| 6,149,299 A * | 11/2000 | Aslan et al. | ............. | 374/178 |
| 6,242,974 B1 * | 6/2001 | Kunst | ............. | 330/9 |
| 6,332,710 B1 * | 12/2001 | Aslan et al. | ............. | 327/512 |
| 6,480,127 B1 * | 11/2002 | Aslan | ............. | 374/178 |
| 6,554,469 B1 * | 4/2003 | Thomson et al. | ............. | 374/178 |
| 6,612,738 B2 * | 9/2003 | Beer et al. | ............. | 374/178 |
| 6,679,628 B2 * | 1/2004 | Breinlinger | ............. | 374/178 |
| 6,724,234 B1 * | 4/2004 | Iliasevitch et al. | ............. | 327/378 |
| 6,726,361 B2 * | 4/2004 | Bisping et al. | ............. | 374/178 |
| 6,733,174 B2 * | 5/2004 | Matsumoto et al. | ............. | 374/178 |

(Continued)

*Primary Examiner*—Gail Verbitsky

(57) ABSTRACT

A three-terminal, dual-diode system is compatible with both fully differential remote and single-ended remote temperature measurement systems. Fully differential remote temperature sensor systems offer better noise immunity and can perform faster conversions with less sensitivity to series resistance than single-ended systems. The two diode system can be used with either fully differential or single-ended temperature measurement systems, which can be used when upgrading from a single-ended architecture to a fully differential architecture, and which can provide backwards compatibility to single-ended architectures for users of fully differential architectures. The simultaneous forwards and backwards compatibilities reduces development risk associated with switching from a proven architecture (e.g., single-ended) to a newer, less-proven, architecture (e.g., fully differential).

20 Claims, 3 Drawing Sheets

U.S. PATENT DOCUMENTS

| | | | |
|---|---|---|---|
| 6,876,250 B2 * | 4/2005 | Hsu et al. | 327/539 |
| 6,991,369 B1 * | 1/2006 | Garavan | 374/178 |
| 7,010,440 B1 * | 3/2006 | Lillis et al. | 702/65 |
| 7,082,377 B1 * | 7/2006 | Aslan et al. | 702/130 |
| 7,084,382 B2 * | 8/2006 | Jensen | 219/765 |
| 7,089,146 B1 * | 8/2006 | D'Aquino et al. | 702/132 |
| 7,112,948 B2 * | 9/2006 | Daly et al. | 323/316 |
| 7,118,273 B1 * | 10/2006 | Schnaitter | 374/168 |
| 7,149,645 B2 * | 12/2006 | Mangrulkar et al. | 702/130 |
| 7,429,129 B2 * | 9/2008 | St. Pierre et al. | 374/178 |
| 2003/0123520 A1 * | 7/2003 | Tesi | 374/178 |
| 2003/0133491 A1 * | 7/2003 | Shih | 374/163 |
| 2004/0001527 A1 * | 1/2004 | Grannes et al. | 374/178 |
| 2005/0220171 A1 * | 10/2005 | Faour et al. | 374/178 |
| 2005/0259718 A1 * | 11/2005 | Phan et al. | 374/178 |
| 2006/0039445 A1 * | 2/2006 | McLeod | 374/178 |
| 2008/0144700 A1 * | 6/2008 | Schnaitter | 374/178 |
| 2009/0009234 A1 * | 1/2009 | St. Pierre et al. | 327/512 |

* cited by examiner

THREE-TERMINAL DUAL-DIODE SYSTEM FOR FULLY DIFFERENTIAL REMOTE TEMPERATURE SENSORS

RELATED APPLICATION

This utility patent application claims the benefit under 35 United States Code § 119(e) of U.S. Provisional Patent Application No. 60/461,538 filed on Apr. 8, 2003.

FIELD OF THE INVENTION

The present invention relates to a method and apparatus for electronic temperature sensing and recording devices. More specifically, the present invention is directed towards temperature measurements made by applying bias currents to a forward-biased PN junction in a dual diode system.

BACKGROUND OF THE INVENTION

Temperature measurements can be made by applying a current to a forward-biased PN junction and measuring the resulting potential across the PN junction. Temperature calculations can be made by determining the difference "$\Delta V_{for}$" that results as a function of different applied currents across a PN junction, using differing areas of PN junctions to which a current is applied, or a combination of both.

DETAILED DESCRIPTION OF THE PREFERRED EMBODIMENT

Figure 1:
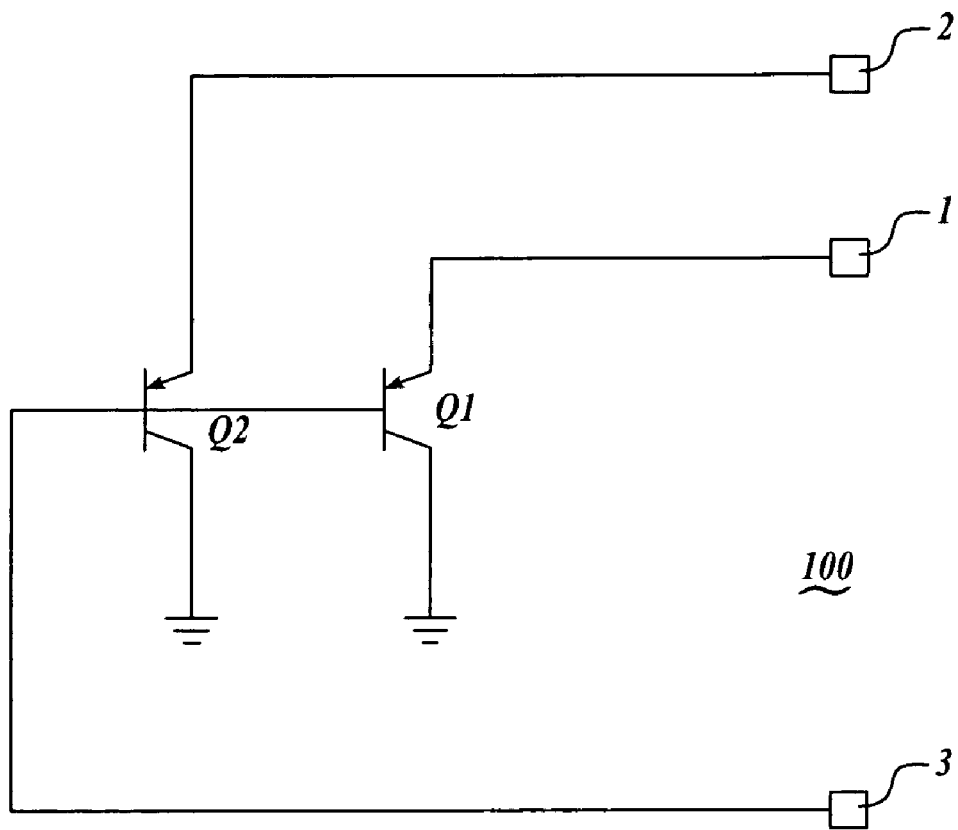
FIG. 1 is a schematic block diagram of a three-terminal dual-diode system for fully differential remote temperature sensors in accordance with the present invention.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention is directed towards a three-terminal, dual-diode system that is compatible with both fully differential and single-ended remote temperature measurement systems. Fully differential remote temperature sensor systems offer better noise immunity and can perform faster conversions with less sensitivity to series resistance than single-ended systems. The two diode system can be used with either fully differential or single-ended temperature measurement systems, which can be used when upgrading from a single-ended architecture to a fully differential architecture, and which can also provide backwards compatibility to single-ended architectures for users of fully differential architectures. The simultaneous forwards and backwards compatibilities reduces development risk associated with switching from a proven architecture (e.g., single-ended) to a newer, less-proven, architecture (e.g., fully differential).

The three-terminal, dual-diode system is formed on a first substrate, which typically also contains a device for which temperature information is desired. The temperature measurement system is formed on a second substrate, and is coupled to the first substrate so that temperature measurements can be made. A fully differential remote temperature system may be coupled to all three terminals of the three-terminal (or only two terminals that are the same polarity terminals of the two PN junctions), dual-diode system, whereas a single-ended remote temperature system only need be coupled to two terminals (that are opposite terminals of a PN junction) of the three-terminal, dual-diode system.

FIG. 1 is a schematic block diagram of a three-terminal dual-diode system for fully differential remote temperature sensors in accordance with the present invention. The three-terminal, dual-diode system (100) comprises two PN junctions, which are illustrated as being embodied within transistors Q1 and Q2. A first PN junction is thus present within transistor Q1 and a second PN junction is present within transistor Q2. The first and second PN junctions each have an associated area, which may be the same or different as discussed below.

Terminal 1 is coupled to the emitter of transistor Q1. Terminal 2 is coupled to the emitter of transistor Q2. The common bases of transistor Q1 and Q2 are coupled to terminal 3. The collectors of transistors Q1 and Q2 are coupled to ground. Terminal 3 may be optionally coupled to an internal (or external) bias circuit such as another diode, current or voltage source, ground, resistors, and the like (including a combination thereof). The bias circuit can be located on a first or a second substrate, or even provided as an external component. For fully differential operation, terminal 3 can be internally biased and need not be wired to a pin of a package containing the first substrate.

Temperature measurements of the PN junctions in system 100 are measured by applying current(s), measuring resulting voltages, and calculating a temperature based on the resulting voltages. A fully differential temperature measurement system applies (typically simultaneously) two currents to the PN junctions via terminals 1 and 2. The currents are applied so that each PN junction is forward-biased. The resulting voltages across the PN junctions from each applied current are measured by the fully differential temperature system. The fully differential temperature measurement system can sample the resulting voltages using a device such as a differential analog-to-digital (ADC) converter. Temperature measurement systems and PN junctions are discussed within U.S. Pat. No. 6,149,299, which is incorporated herein by reference.

A single-ended temperature measurement system applies in succession a first and second current to terminal 1 and/or 2 such that the associated PN junction is forward biased. The first and second currents are different sizes as discussed below. The resulting voltages across the PN junction from each successively applied current are measured by the single-ended temperature system. The single-ended temperature system may measure the voltages by using a device such as an LM86.

In various embodiments, the temperature measurement system may be implemented by a converter such that the values produced by the converter may be processed within an analog environment, a digital environment, or a mixed-signal environment. The samples may be averaged to reduce the effects of noise and to enhance the accuracy of calculations using values derived by the analog-to-digital conversions. Samples are typically made at regular intervals such that each sample is separated from other samples by substantially equal time differences.

Temperature calculations can be determined according to the following formula:

$$T = \frac{q\Delta V_{for}}{\eta K \ln(N)} \quad (I)$$

where T=absolute temperature in degrees Kelvin,
q=the charge on the carrier (electron charge),
$\Delta V_{for}$=change in the forward-biased voltage,
K=Boltzmann's constant,
N=ratio of the two applied currents and areas, and
η=ideality factor of the diode.

The ratio (N) can be realized as a combination of area ratios of the PN junctions using a common current, a ratio of currents across two PN junctions that have the same area, or a combination thereof. Generally, the change in the forward-biased diode voltage ($\Delta V_{for}$) can be determined by subtracting the measured voltages that resulted by applying two different currents:

$$\Delta V_{for} = VBE2 - VBE1 = \eta \times \frac{KT}{q} \times \ln\left(\frac{I2}{I1} \times \frac{A1}{A2}\right) \quad (II)$$

where VBE2 is the voltage across a PN junction resulting from a second applied current, VBE1 is the voltage across a PN junction resulting from a first applied current; I2 is the second applied current, I1 is the first applied current, A1 is the junction area of the PN junction to which the I1 is applied, and A2 is the junction area of the PN junction to which I2 is applied.

"Where only one single PN junction is used, currents I1 and I2 have different current values and are successively applied to the PN junction via a corresponding one of the terminals (see FIG. 1 where either the currents are applied to Q1 via only terminal 1, or the currents are applied to Q2 via only terminal 2). VBE1 is measured during the first applied current (I1) and VBE2 is measured during the second applied current (I2) to the same terminal (see FIG. 1, where the voltage measurement is only from terminal 1 for Q1, or only from terminal 2 for Q2)."

Where two different PN junctions are used, currents I1 and I2 are applied to two separate PN junctions. Currents I1 and I2 can have the same current values when the junction areas of the PN junctions have different areas. The PN junctions can have the same area where currents I1 and I2 have different current values. Likewise currents I1 and I2 having different current values and PN junctions having differing areas can be used.

Where two different PN junctions are used, the junctions ideally should have the same PN junction temperature despite the fact that they cannot exist in the exact same physical location. Similarly, a single PN junction (including "stacked diodes" and PN junctions in parallel) can be used to determine the ratio (N) by successively applying two different currents to the single PN junction. Using a single PN junction also reduces the area required for implementing the circuitry. However, the temperature of the PN junction may vary between the successive voltage measurements from the two different applied currents. Errors in the value of the calculated temperature may result from variations in temperature between successive measurements of the forward-biased voltage. Errors are more likely to occur when the PN junction is in a remote system where the PN junction is not affected by the thermal mass of a package containing the temperature measurement system. Without sufficient thermal mass, the temperature of the PN junction can change rapidly with respect to the sampling rate of system 100. Keeping the time between applications of the successive currents relatively small can reduce the magnitude of errors due to temperature drift of the PN junction.

Figure 2:
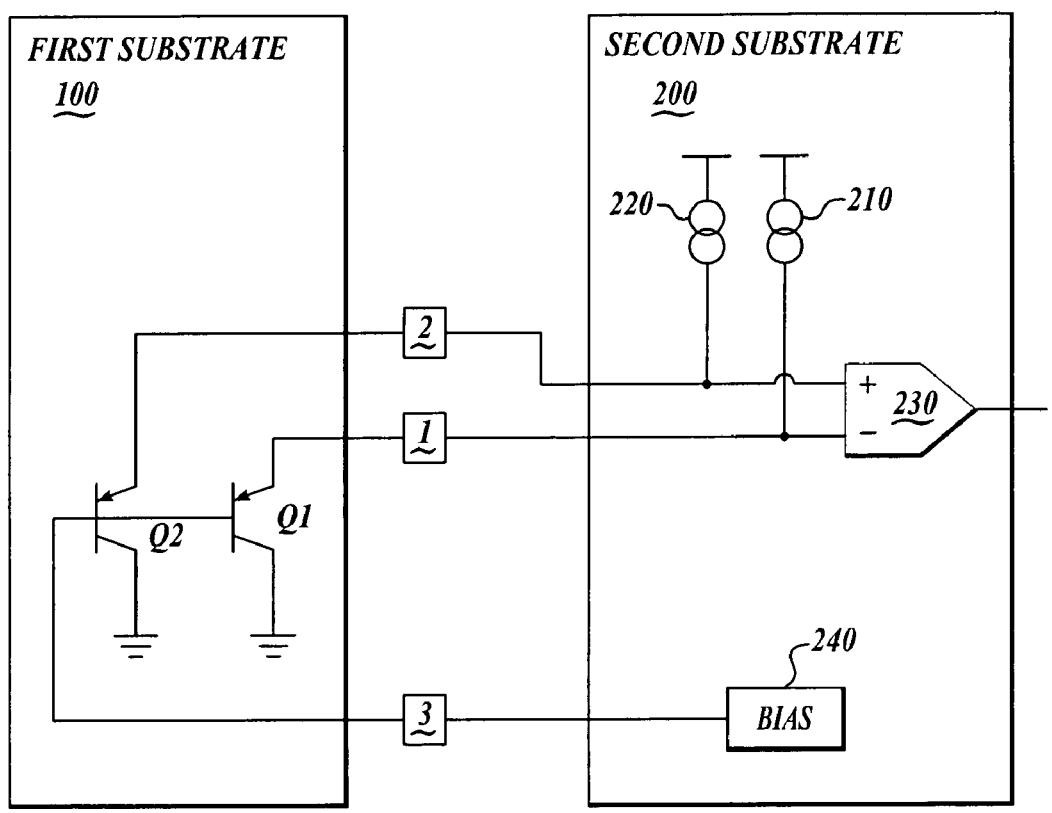
FIG. 2 is a schematic diagram of a three-terminal dual-diode system used in a differential mode in accordance with the present invention.

FIG. 2 is a schematic diagram of a three-terminal dual-diode system used in a differential mode in accordance with the present invention. Fully differential measurement system 200 is formed on a second substrate that is different from the first substrate upon which system 100 is formed. System 200 comprises current sources 210 and 220, differential converter 230 and a bias circuit 240. Bias circuit 240 is coupled to terminal 3. Current source 210 is coupled to terminal 1, and current source 220 is coupled to terminal 2. Differential converter 230 has a first input that is coupled to terminal 1, and a second input that is coupled to terminal 2.

In operation, bias circuit 240 applies a bias voltage to the bases of transistors Q1 and Q2. The bias circuit (240) can be located on a first or a second substrate, or even provided as an external component. Current sources 210 and 220 apply currents to terminals 1 and 2 such that the PN junctions of Q1 and Q2 are forward biased. The currents can have the same current values when the junction areas of the PN junctions have different areas. The PN junctions can have the same area where the currents have different current values. Likewise the currents may have different current values in addition to the PN junctions of system 100 having different areas as discussed above. Differential converter 230 makes a differential voltage measurement by measuring the voltages of terminals 1 and 2.

Figure 3:
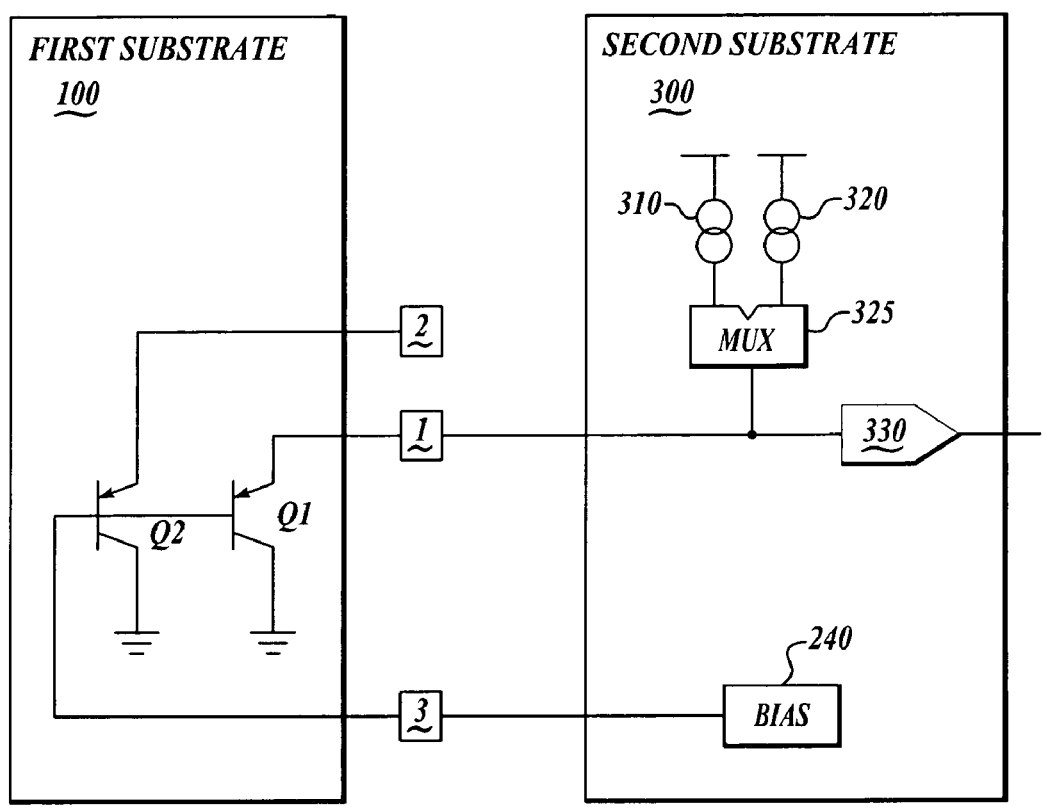
FIG. 3 is a schematic diagram of a three-terminal dual-diode system used in a single-ended mode in accordance with the present invention.

FIG. 3 is a schematic diagram of a three-terminal dual-diode system used in a single-ended mode in accordance with the present invention. Single-ended measurement system 300 is formed on a second substrate that is different from the first substrate upon which system 100 is formed. System 300 comprises current sources 310 and 320, converter 330 and a bias circuit 240. Bias circuit 240 is coupled to terminal 3. Current sources 310 and 320 are coupled to the inputs of multiplexor 325. The output of multiplexor 325 is coupled to a selected terminal (terminal 1, terminal 2, or both terminals). Multiplexor 325 is configured to alternately couple the selected current source to the output of the multiplexor. Converter 330 has an input that is coupled to the selected terminal.

In operation, bias circuit 240 applies a bias voltage to the terminal 3. Multiplexor 325 alternately applies current sources 310 and 320 to the selected terminal such that the PN junction associated with the selected terminal is forward biased. The currents values of current sources 310 and 320 are different as discussed above. Converter 330 makes a voltage measurement by measuring the voltages of the selected terminal.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A system for measuring temperatures of a device, comprising:
a dual diode system comprising a first junction diode and a second junction diode, wherein the first junction diode and the second junction diode are collocated on a first substrate, the dual diode system having (i) a first terminal that is coupled to a first electrode of the first junction diode, wherein the first electrode of the first junction diode has a first polarity, (ii) a second terminal that is coupled to a first electrode of the second junction diode, wherein the first electrode of the second junction diode has the first polarity, and (iii) a third terminal that is coupled to second electrodes of the first and second junction diodes, wherein the second electrodes of the first and second junction diodes have a second polarity that is opposite of the first polarity;
a temperature measurement circuit that is located on a second substrate and that is configured to perform a voltage measurement by measuring two voltages that result after successively applying two different currents to a single junction diode through a single terminal, wherein the single junction diode is one of the first junction diode and the second junction diode, and wherein the single terminal is one of the first terminal and the second terminal; and
a bias circuit that is configured to bias the third terminal.

2. A system for measuring temperatures of a device, comprising:
a dual diode system comprising a first junction diode of a first transistor and a second junction diode of a second transistor, wherein the first transistor and the second transistor are collocated on a first substrate, wherein the first transistor and the second transistor are of a same transistor type, and wherein the dual diode system has (i) a first terminal coupled to an emitter of the first transistor, (ii) a second terminal coupled to an emitter of the second transistor, and (iii) a third terminal coupled in common with a base of the first transistor and a base of the second transistor;
a temperature measurement circuit that is located on a second substrate and that is configured to (i) perform a first voltage measurement at a single terminal after applying a first current to a single junction diode through the single terminal and (ii) perform a second voltage measurement at the single terminal after applying a second current to the single junction diode through the single terminal, wherein the single junction diode is one of the first junction diode and the second junction diode, and wherein the single terminal is one of the first terminal and the second terminal; and
a bias circuit that is configured to bias the third terminal.

3. The system of claim 1, wherein:
the first electrode of the first junction diode comprises a cathode;
the first electrode of the second junction diode comprises a cathode; and
each of the second electrodes of the first and second junction diodes comprises an anode.

4. The system of claim 1, wherein the bias circuit is located on the first substrate.

5. The system of claim 1, wherein the bias circuit is located on one of the second substrate, a third substrate, and a discrete component.

6. The system of claim 1, wherein the temperature measurement circuit is configured to perform the voltage measurement using the third terminal.

7. The system of claim 1, wherein:
the temperature measurement circuit is configured to perform the voltage measurement by using only the first terminal in response to the two currents applied to the first terminal at different times; and
the temperature measurement circuit is configured to determine a junction temperature of the first junction diode.

8. A method for measuring a temperature of a device, comprising:
providing a dual diode system on a first substrate wherein the dual diode system comprises (i) a first terminal that is coupled to a first electrode of a first junction diode, wherein the first electrode of the first junction diode has a first polarity, (ii) a second terminal that is coupled to a first electrode of a second junction diode, wherein the first electrode of the second junction diode has the first polarity, and (iii) a third terminal that is coupled to second electrodes of the first and second junction diodes, wherein the second electrodes of the first and second junction diodes have a second polarity that is opposite of the first polarity, and wherein the first junction diode and the second junction diode are collocated on the first substrate;
providing a temperature measurement circuit on a second substrate;
performing a voltage measurement by measuring two voltages at a single terminal after successively applying two different currents to the single terminal such that the two different currents are applied to a single junction diode, wherein the single junction diode is one of the first junction diode and the second junction diode, wherein the single terminal is one of the first terminal and the second terminal, and wherein the voltage measurement is performed using the temperature measurement circuit; and
biasing the third terminal.

9. The method of claim 8, wherein:
the first electrode of the first junction diode comprises an emitter;
the first electrode of the second junction diode comprises an emitter; and
each of the second electrodes of the first and second junction diodes comprises a base.

10. The method of claim 8, wherein:
the first electrode of the first junction diode comprises a cathode;
the first electrode of the second junction diode comprises a cathode; and
each of the second electrodes of the first and second junction diodes comprises an anode.

11. The method of claim 8, wherein biasing the third terminal is performed using a bias circuit that is located on the first substrate.

12. The method of claim 8, wherein biasing the third terminal is performed using a bias circuit that is located on one of the second substrate, a third substrate, and a discrete component.

13. The method of claim 8, wherein the couplings between the electrodes and the terminals are connections.

14. The method of claim 8, wherein the temperature measurement circuit comprises a differential analog-to-digital converter.

15. A system for measuring a temperature of a device, comprising:
a dual diode system comprising a first junction diode means and a second junction diode means, wherein the first junction diode means and the second junction diode means are collocated on a first substrate, wherein the dual diode system comprises (i) a first terminal that is coupled to a first electrode of the first junction diode means, wherein the first electrode of the first junction diode means has a first polarity, (ii) a second terminal that is coupled to a first electrode of the second junction diode means, wherein the first electrode of the second junction diode means has the first polarity, and (iii) a third terminal that is coupled to second electrodes of the first and second junction diode means, wherein the second electrodes of the first and second junction diode means have a second polarity that is opposite of the first polarity;

means for measuring a signal located on a second substrate;

means for performing a voltage measurement at a single terminal after successively applying two different currents to the single terminal such that the two different currents are applied to a single junction diode means, wherein the single junction diode means is one of the first junction diode means and the second junction diode means, wherein the single terminal is one of the first terminal and the second terminal, and wherein the voltage measurement is performed using the means for measuring; and means for biasing the third terminal.

16. The system of claim 15, wherein:
the first electrode of the first junction diode means comprises an emitter;
the first electrode of the second junction diode means comprises an emitter; and
each of the second electrodes of the first and second junction diode means comprises a base.

17. The system of claim 15, wherein:
the first electrode of the first junction diode means comprises a cathode;
the first electrode of the second junction diode means comprises a cathode; and
each of the second electrodes of the first and second junction diode means comprises an anode.

18. The system of claim 15, wherein the means for biasing the third terminal comprises a bias circuit that is located on the first substrate.

19. The system of claim 15, wherein the means for biasing the third terminal comprises a bias circuit that is located on one of the second substrate, a third substrate, and a discrete component.

20. The system of claim 15, wherein the means for measuring is configured to perform the voltage measurement using different currents on the same junction diode means.

* * * * *